(12) United States Patent
Kwon

(10) Patent No.: US 7,587,265 B2
(45) Date of Patent: Sep. 8, 2009

(54) APPARATUS AND METHOD OF MANAGING VEHICLE MAINTENANCE INFORMATION IN A MOBILE TERMINAL

(75) Inventor: Hae-Moon Kwon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 837 days.

(21) Appl. No.: 11/191,714

(22) Filed: Jul. 28, 2005

(65) Prior Publication Data
US 2006/0047383 A1    Mar. 2, 2006

(30) Foreign Application Priority Data
Jul. 28, 2004    (KR) ...................... 10-2004-0059046

(51) Int. Cl.
  *G01M 17/00*    (2006.01)
(52) U.S. Cl. .............................. 701/35; 701/29; 701/30; 701/36; 340/438
(58) Field of Classification Search .................. 701/29, 701/33, 35, 36, 30; 340/425.5, 438, 439; 342/357.1
See application file for complete search history.

(56) References Cited

U.S. PATENT DOCUMENTS

| | | | |
|---|---|---|---|
| 6,028,537 A * | 2/2000 | Suman et al. | 340/988 |
| 6,823,244 B2 * | 11/2004 | Breed | 701/29 |
| 6,879,894 B1 * | 4/2005 | Lightner et al. | 701/33 |

FOREIGN PATENT DOCUMENTS

KR    20-0179176    4/2000

* cited by examiner

*Primary Examiner*—Gertrude Arthur Jeanglaud
(74) *Attorney, Agent, or Firm*—The Farrell Law Firm, LLP

(57) ABSTRACT

A mobile apparatus having car care book function in a mobile terminal. The apparatus includes a database for managing vehicle information, repair record and repair items required according to the distance covered; a controller for reading out the repair items required according to the distance covered and the recent repair record for a given period of time from the database, comparing the required repair items and the recent repair record, determining the repair item(s) requiring inspection through the comparison, and outputting the required repair item(s); and a display for displaying the required repair item(s) on a window.

9 Claims, 11 Drawing Sheets

FIG.3A

- 08:30
- VEHICLE INFORMATION
- NUMBER: 30 NA 1234
- NAME: AVANTE XD
- YEAR: 2002.02
- PURCHASE DATE: 2003.01.11
- DISTANCE COVERED: 24000 Km
- INSURANCE COMPANY: SAMSUNG INSURANCE CO.,LTD.

MENU
1. ADD
2. DELETET
3. ADD INSURANCE COMPANY
4. DELETET INSURANCE COMPANY

FIG.3B

- 08:30
- INSURANCE COMPANY INFORMATION
- INSURANCE COMPANY: SAMSUNG INSURANCE CO.,LTD.
- ENTRANCE DATA: 2003.02.01
- EXPIRATION DATA: 2004.02.01
- PERSON IN CHARGE: Mr. Kim
- TEL NO.: 02-2222-1111
- CELL PHONE NO.: 010-4321-2222
- ALARMING EXPIRATION DATE: ◀ 7 DAYS IN ADVANCE ▶

MENU
1. TALK
2. SAVE
3. DELETE
4. PHONE BOOK SAVE

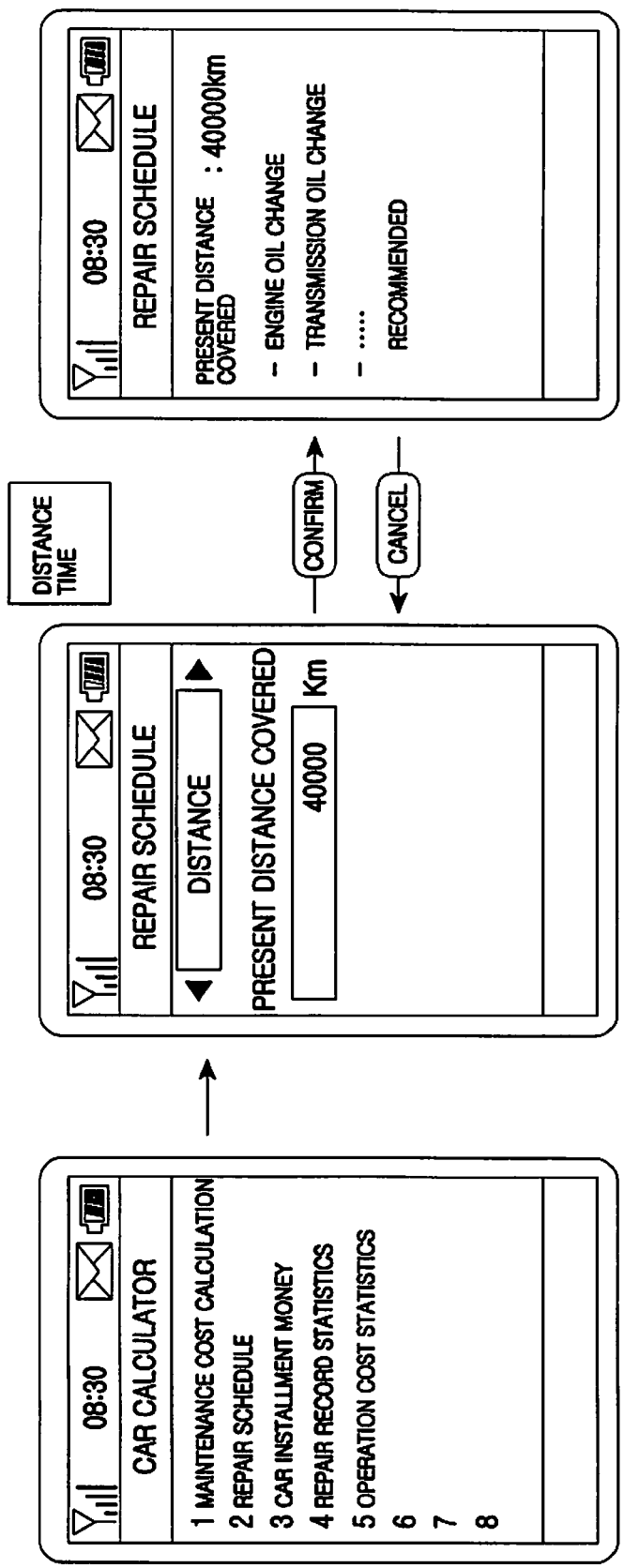

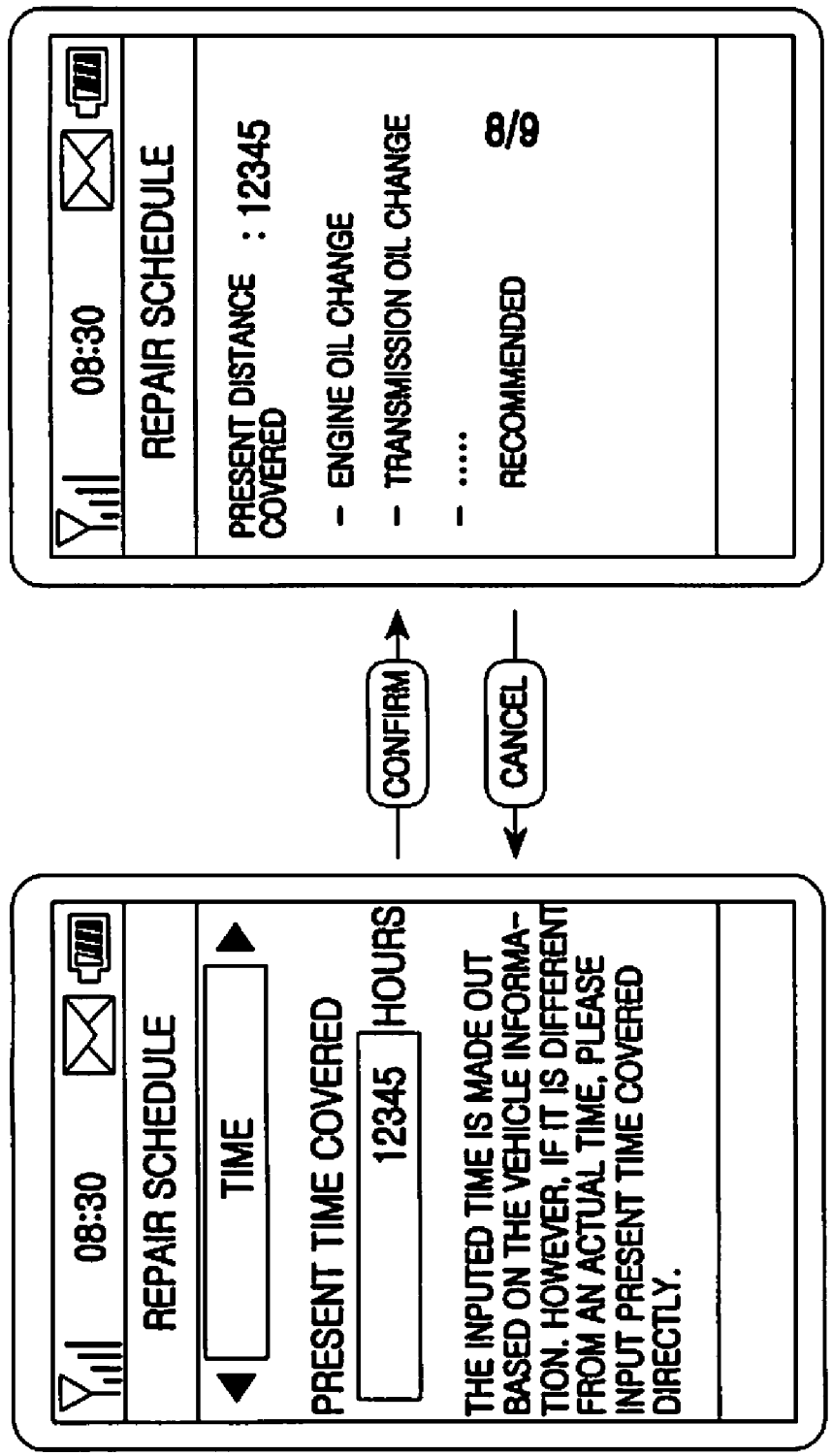

APPARATUS AND METHOD OF MANAGING VEHICLE MAINTENANCE INFORMATION IN A MOBILE TERMINAL

PRIORITY

This application claims priority to an application entitled "APARATUS AND METHOD FOR MANAGING VEHICLE MAINTENANCE INFORMATION IN MOBILE COMMUNICATION TERMINAL" filed in the Korean Intellectual Property Office on Jul. 28, 2004 and assigned as Ser. No. 2004-59046, the contents of which are incorporated herein by reference.

BACKGROUND OF THE INVENTION

1. Field of the Invention

The present invention relates to an apparatus and method for managing vehicle (car) maintenance information in a mobile terminal, and in particular, for performing a car care book function in a mobile terminal.

2. Description of the Related Art

Along with the rapid proliferation of mobile terminals due to their convenient portability, service providers and terminal manufacturers are competing to develop mobile terminals with advanced functions to secure more users. For example, there are mobile terminals offering various functions such as a phone books, games, schedulers, short message services, Internet services, e-mail services, morning call services, electric calculators, etc.

According to the recent statistics, there are about 15,500,000 automobiles and 37,000,000 mobile terminals in Korea alone. In general, car care books, which is a necessity for proper car management, has progressed from traditional notebook types into bankbook types, and further into cyber car care book types.

When using a cyber car care book type manual, a user (i.e., an online member) can store information on car care such as the distance covered, gas (fuel) costs, repair costs, supply expenses, parts expenses etc., and other car management information in an online database, and the online member can then manage and retrieve such information from the database. For example, the member can check the latest inspection date, the record of gas supply, the date and time that supplies and parts were changed and the expected time that parts and supplies must be changed based on the distance covered from the database. Thus, typical inconveniences such as having to manually enter and calculate cost and time of repair are eliminated or substantially reduced.

Cyber car care book type manuals, however, require a user to connect to a website of a cyber car care book type manual and require the user to check management items often. Due to the inconvenience resulting from having to access a website, a user may inadvertently miss an inspection time for proper car care. In addition, because a cyber car care book type manual based on a computer lacks mobility, a user may not input the information for proper car care, such as gas costs, repair costs, etc. into the proper database in a timely fashion.

SUMMARY OF THE INVENTION

It is, therefore, an object of the present invention to provide an apparatus and method of implementing car care book function in a mobile terminal having mobility and a calculating capability.

It is another object of the present invention to provide an apparatus and method for managing vehicle maintenance information in a mobile terminal.

It is a further object of the present invention to provide an apparatus and a method for informing users of car inspection item(s) according to the covered distance and time in a mobile terminal.

It is a further object of the present invention to provide an apparatus and a method for informing users of the expiration date of car insurance and the reservation time of car repair in a mobile terminal.

To achieve the above objects according to the present invention, an apparatus having car care book function in a mobile terminal, includes a database for managing vehicle information, repair record and repair items required according to the distance covered; a controller for reading out the repair items required according to the distance covered and the recent repair record for a given period of time from the database, comparing said required repair items and said recent repair record, determining the repair item(s) requiring inspection through the comparison, and outputting the required repair item(s); and a display for displaying the required repair item(s) on a window.

BRIEF DESCRIPTION OF THE DRAWINGS

The above and other objects, features and advantages of the present invention will become more apparent from the following detailed description when taken in conjunction with the accompanying drawings in which:

FIG. 3 illustrates screens which are displayed when a vehicle registration mode is performed according to the present invention;

FIG. 5 illustrates screens which are displayed when repair reservation function is performed according to the present invention;

FIG. 8 illustrates screens which are displayed when the repair item(s) requiring inspection is decided according to the covered distance and time in the present invention.

DETAILED DESCRIPTION OF THE PREFERRED EMBODIMENTS

Preferred embodiments of the present invention will be described herein below with reference to the accompanying drawings. In the following description, well-known functions or constructions are not described in detail to avoid obscuring the invention with unnecessary detail.

The following description explains a mobile terminal having car care book function and method of application thereof.

Figure 1:
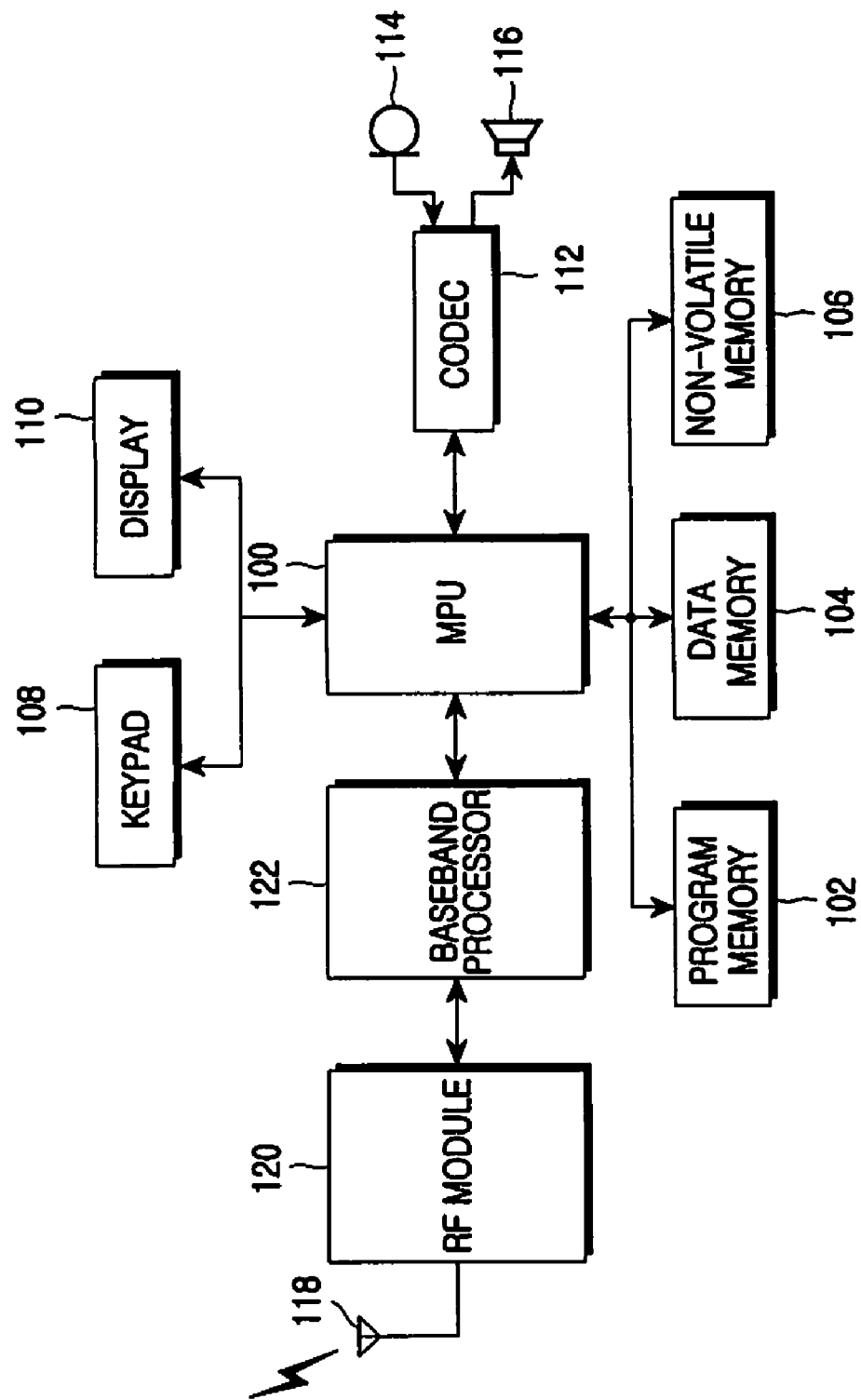
FIG. 1 is a block diagram of a mobile terminal according to an embodiment of the present invention.

FIG. 1 is a block diagram of a mobile terminal according to an embodiment of the present invention. The mobile terminal can be any of a cellular phone, PCS (Personal Communication System), PDA (Personal Digital Assistant), and IMT-2000 (International Mobile Communication-2000) terminal. The following description is provided based on the general structure of such terminals.

Referring to FIG. 1, a microprocessor unit (MPU) 100 provides overall control to a mobile terminal. The MPU 100 is responsible for processing and controlling voice and data communications, and additionally it performs a car care book function for managing vehicle management information according to the present invention. A description of the general operation of the MPU 100 is known in the art and is not provided herein.

A program memory 102 stores programs for controlling the entire operation of a mobile terminal. The program memory 102 may be a flash memory. A data memory 104 temporarily stores data generated during the operation of a mobile terminal. The data memory 104 may be a RAM (Random Access Memory). A non-volatile memory 106 stores phone numbers registered for hot-key dialing and system parameters. The non-volatile memory 106 may be an EEPROM (Electrically Erasable Programmable Read Only Memory). Herein, the database according to car care book function can be stored at the non-volatile memory 106. The database for the car care book function may be divided into a vehicle information database for managing the detailed information of a vehicle (e.g., a car), of car repair records, a car operation history database and a car calculator database for the repair items required according to the covered distance and time.

A keypad 108 includes digit keys 0 to 9, a Menu key, a Cancel (Delete) key, an OK key, a Talk key, an End key, an Internet key, navigation (or directional) keys (▲/▼/◄/►), etc. The keypad 108 provides key input data corresponding to a user-pressed key to the MPU 100. A display 110 displays the state information generated during the operation of a mobile terminal, a limited number of characters, moving pictures and still images. An LCD (Liquid Crystal Display) may be used for the display 110.

A CODEC (Coder-Decoder) 112 connected to the MPU 100, and a speaker 116 and a microphone 114, which are connected to the CODEC 112, collectively form a voice input/output block for performing functions such as phone call and voice recording. The CODEC 112 converts PCM (Pulse Code Modulation) data received from the MPU 100 to an analog voice signal and outputs the analog voice signal through the speaker 116. The CODEC 112 also converts a voice signal received through the microphone 114 to PCM data and feeds the PCM data to the MPU 100.

An RF (Radio Frequency) module 120 downconverts an RF frequency signal received through an antenna 118 and provides the signal to a baseband processor 122. The RF module 120 upconverts a baseband frequency signal received from the baseband processor 122 and transmits the signal through the antenna 118. The baseband processor 122 processes a baseband signal between the RF module 120 and the MPU 100. For example, the baseband processor 122 channel-encodes and spreads the data to be transmitted, and despreads and channel-decodes the received data.

Figure 2:
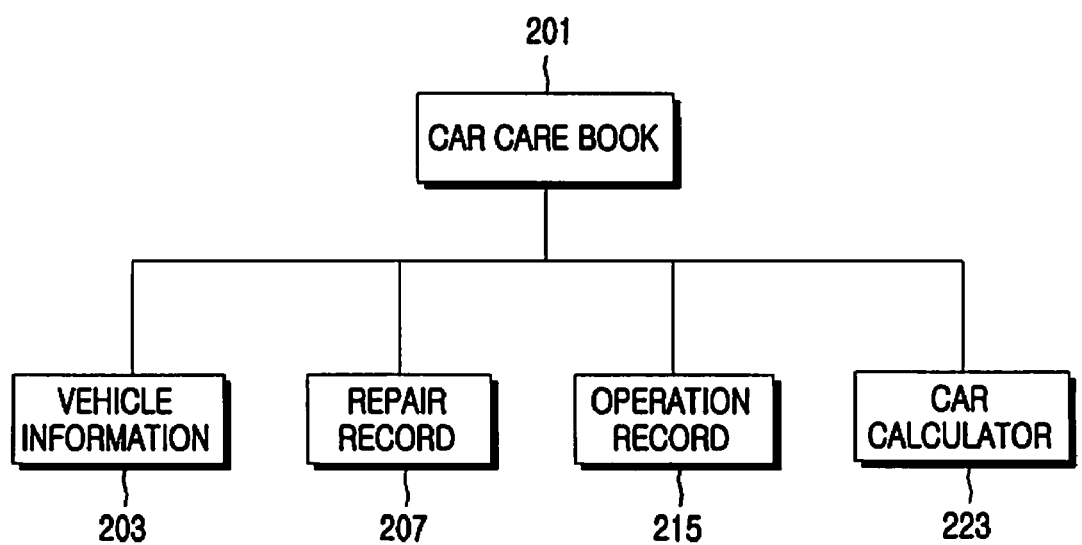
FIG. 2 illustrates a menu structure for performing a car care book function in a mobile terminal according to another embodiment of the present invention.
Figure 4A:
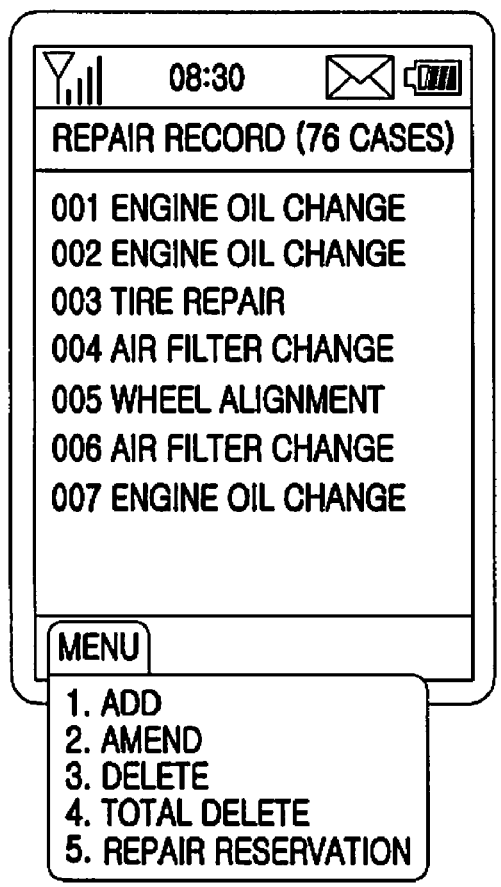
FIG. 4 illustrates screens which are displayed when a repair record-management mode is performed according to the present invention.
Figure 4B:
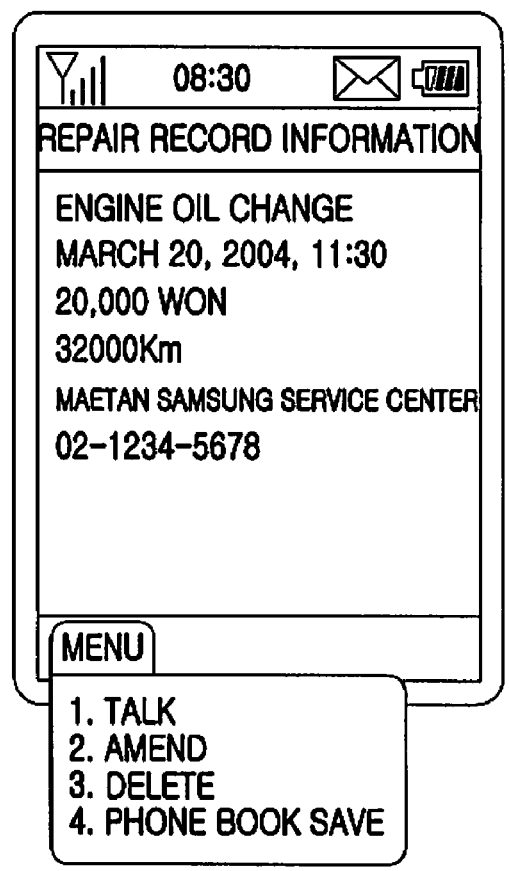

FIG. 2 illustrates a menu structure for performing a car care book function in a mobile terminal according to an alternative embodiment of the present invention. A car care book function 201 includes vehicle information 203, repair record 207, operation record 215 and car calculator 223. The vehicle information 203 includes detailed information on vehicle and insurance information. The repair record 207 manages the detailed car repair record as input and service center information. The operation record 215 manages vehicle operation information as input. The car calculator 223 includes the functions of calculating operation costs, maintenance costs and car installment money, and statistics. The car care book function of the present invention is performed through the menu tree as shown.

Details of the car care book function in accordance with the above-mentioned menu tree are as follows:

If a user has an access to the car care book function, the user can select one of the vehicle information 203, the repair record 207, the operation record 215 and the car calculator 223. As shown in FIGS. 3A and 3B, the vehicle information 203 includes vehicle registration number, vehicle name (e.g., model name), insurance company information, etc. In addition, the telephone number included in the insurance company information is linked to the automatic call system of a mobile terminal, and thus as shown in FIG. 3(B), pressing a Talk key performs an automatic calling to the displayed telephone number of the insurance company.

Figures 5A, 5B:
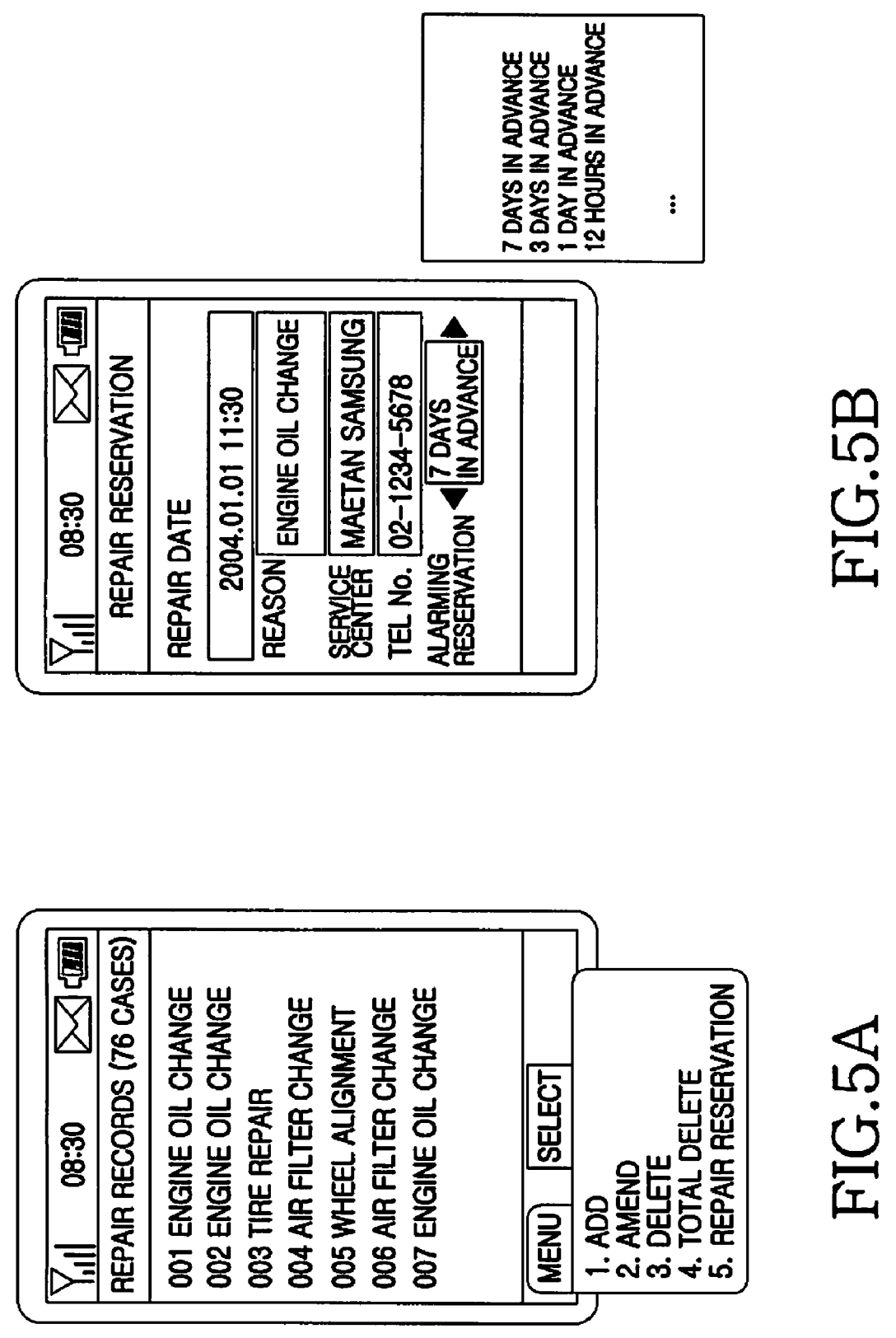
Figures 6A, 6B:
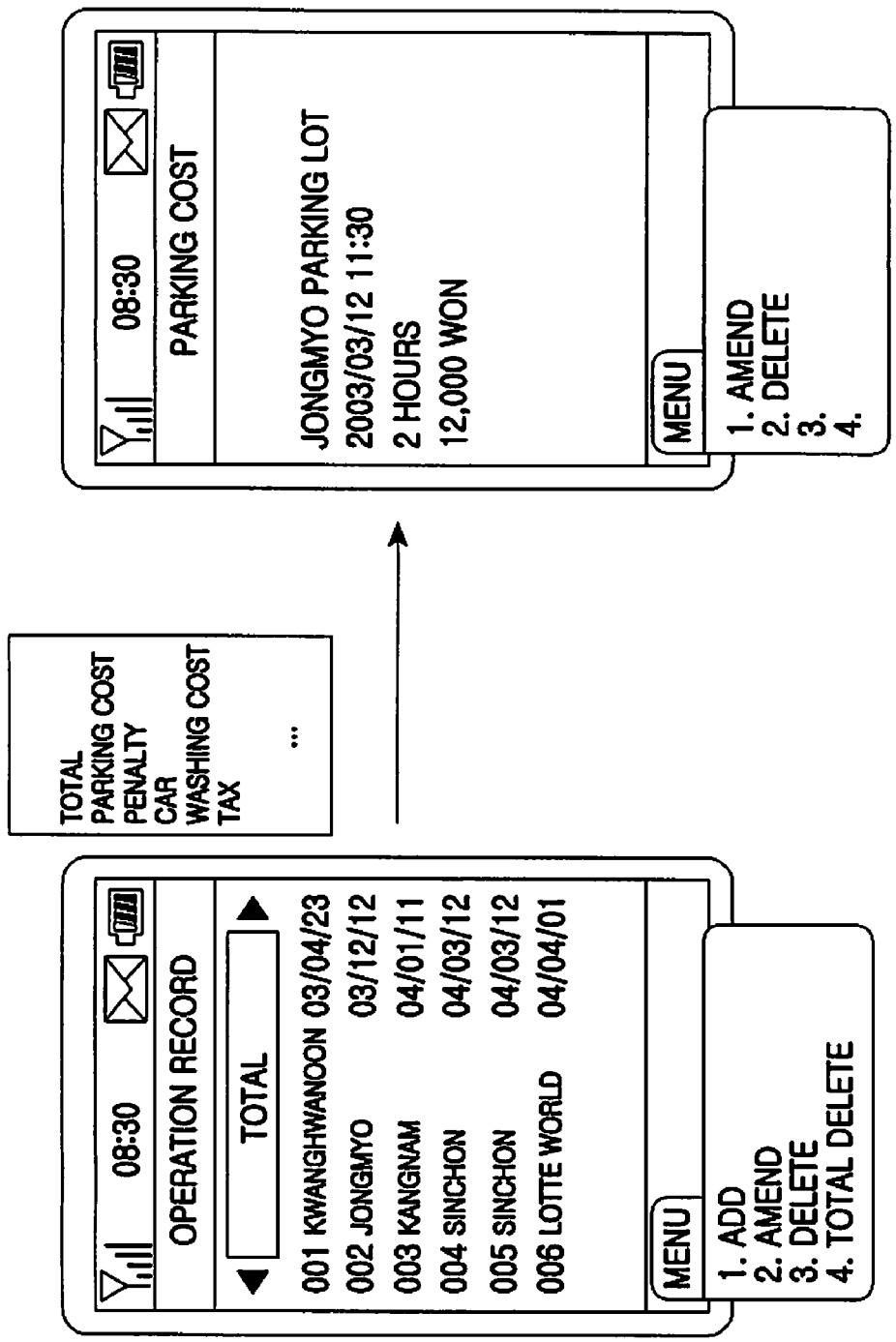
FIG. 6 illustrates screens which are displayed when an operation record-management mode is performed according to the present invention.
Figure 6C:
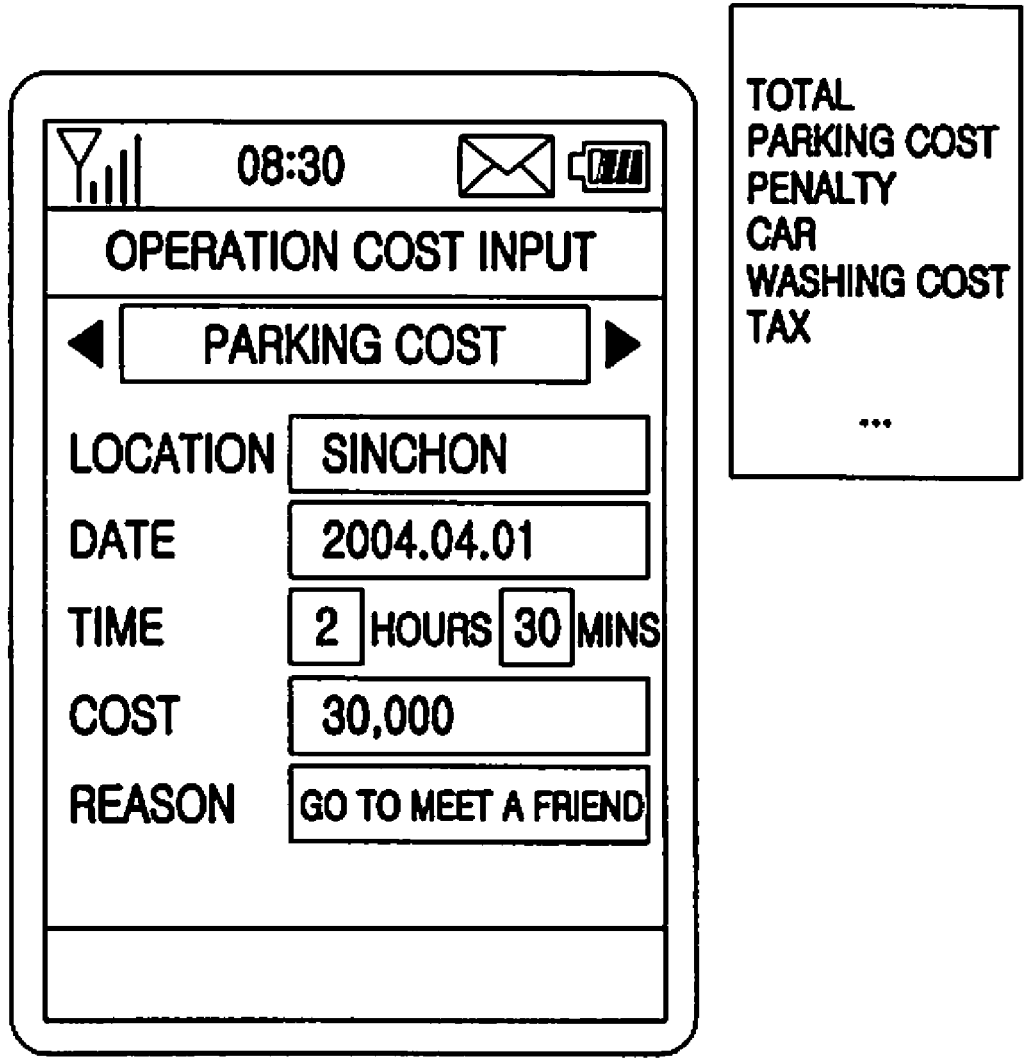

As shown in 4A, 4B, FIGS. 5A and 5B, the repair record 207 includes the detailed car repair record and the service center information. The operation record 215 includes the vehicle operation information, as shown in FIGS. 6A, 6B AND 6C. That is, the operation record 215 manages the vehicle operation information such as the operation costs input by a user.

Figures 7A, 7B:
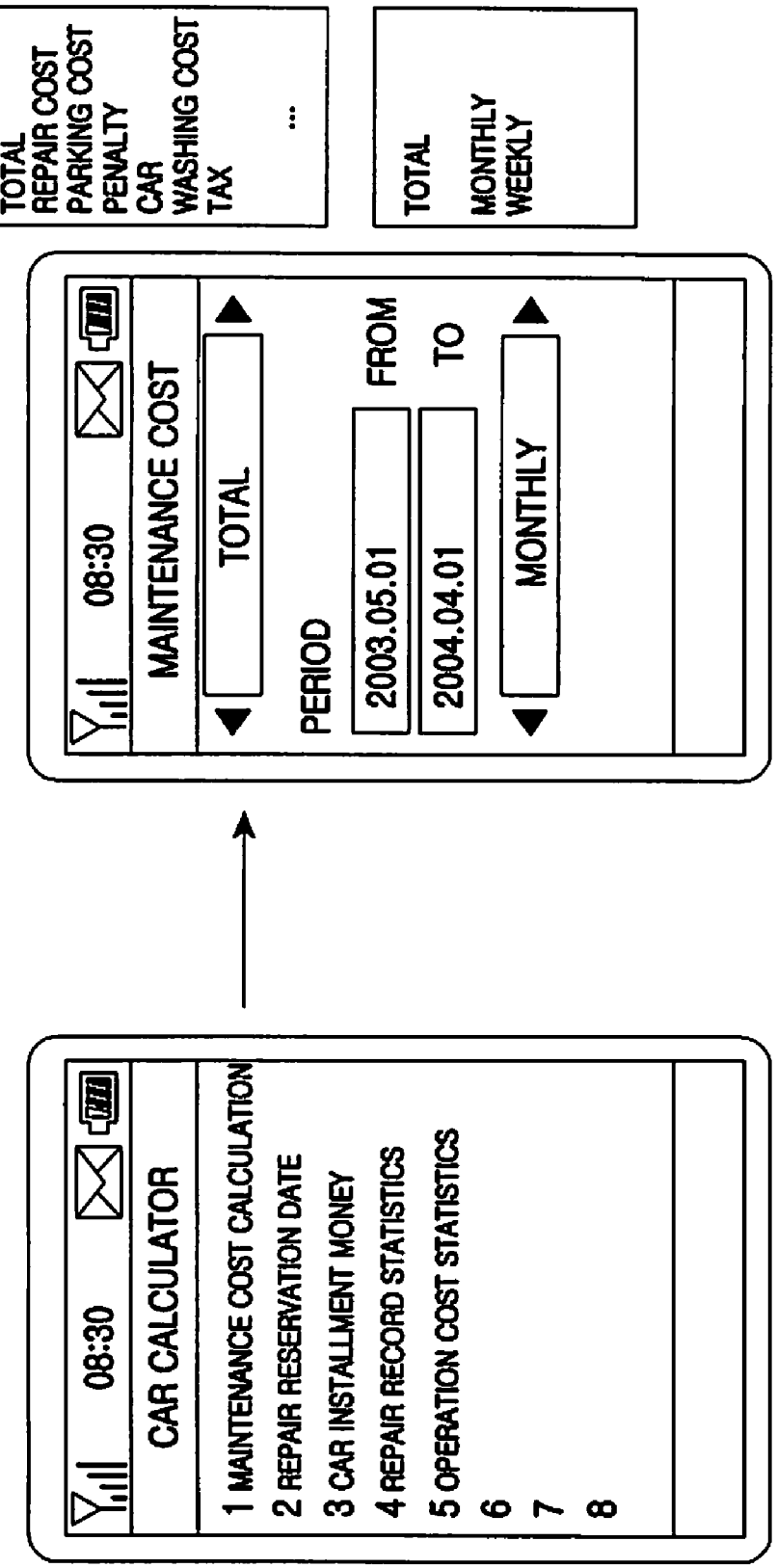
FIG. 7 illustrates screens which are displayed when a car care calculator mode is performed according to the present invention.

FIG. 7 and illustrate car care calculation functions. Specifically, FIGS. 7A and 7B illustrate the car calculator function for maintenance cost calculation, and FIG. 8 illustrates the car calculator function for the repair item(s) requiring inspection according to the covered distance and time.

TABLE 1

| The distance covered (km) | Repair items |
|---|---|
| 9,000~11,000 | engine oil change, change of front brake pads |
| 19,000~21,000 | engine oil change, antifreeze solution change, rotation of tire location, change of spark plugs and high pressure cable, fuel filter change, change of front brake pads |
| 29,000~31,000 | engine oil change, change of front brake pads |
| 39,000~41,000 | engine oil change, transmission oil change, hand transmission oil change, automatic transmission oil change, brake solution change, antifreeze solution change, V-belts (whole) change, rotation of tire location |
| . . . | . . . |

Table 1 illustrated below shows the repair items requested according to the distance covered. For example, when the present distance covered is 10,000 km, the required repair items are "engine oil change" and "change of front brake pads", and such repair items are displayed on the display 110. FIG. 8 C illustrates an alternative embodiment of the present invention wherein "the present distance covered: 40,000 km—engine oil change—transmission oil change . . . recommended" is displayed. Moreover, when the required repair items are displayed in a window, the telephone number of a service center, stored in the database of the data memory 104 in a mobile terminal, may also be displayed in the window at the same time. Then, pressing a Talk key, may initiate an automatic call to the service center.

Figure 9:
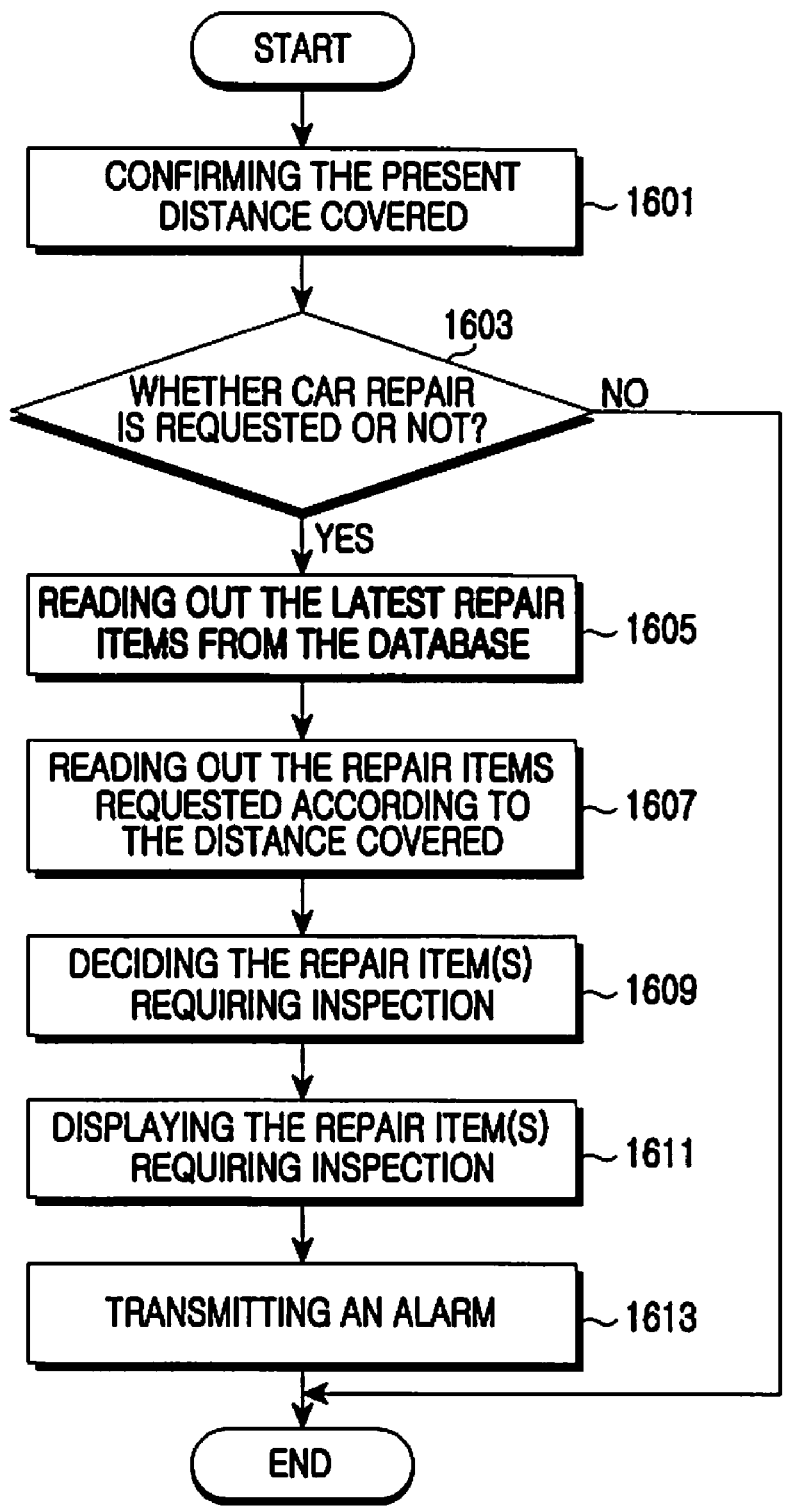
FIG. 9 is a flow chart for performing the alarm function for automatically informing of the repair item(s) requiring inspection in a mobile terminal according to an embodiment of the present invention.

FIG. 9 is a flowchart for performing an automatic alarm function in a mobile terminal according to an alternative embodiment of the present invention. In order to perform the automatic alarm function, the standard distance covered (e.g., 5,000 km and 10,000 km etc.) at which car repair is required should be stored in advance. The MPU 100 first determines whether the present distance covered has been input in step 1601. The distance covered may be input by a user or by receiving it through the communication with the controller of vehicle. If the distance covered has been input, the input distance covered is automatically stored at a car care book. In step 1603, the MPU 100 decides whether car repair is requested or not by comparing the input distance covered (i.e., the present distance covered) with the standard distance covered.

Once it is decided that car repair is requested, the MPU 100 reads out the information of the stored repair record in step 1605 and then proceeds to step 1607. The MPU 100 reads out the repair items requested according to the present distance covered from the car calculator database in step 1607. The repair items requested according to the standard distance covered are stored as shown in Table 1. For example, if the present distance covered is 10,000 km, the repair items requiring inspection are "engine oil change" and "change of front brake pads".

After reading out the repair items requested according to the present distance covered, the MPU compares the repair items of the latest repair record with the repair items requested according to the present distance covered and decides the repair item(s) requiring inspection in step 1609. For example, if the present distance covered is 10,000 km and the repair item of the latest repair record is only "engine oil change", the repair item requiring inspection is "change of front brake pads". The MPU 100 then displays the repair item(s) requiring inspection in a window in step 1611. For example, as illustrated in FIG. 8, "the present distance covered: 40,000 km—engine oil change—transmission oil change . . . recommended" is displayed.

After displaying the repair item(s) requiring inspection, the MPU 100 transmits alarm to let a user know the repair item(s) requiring inspection in step 1613 and completes the algorithm.

In the above-mentioned examples, repair items are decided according to the distance covered. However, in some cases, repair items may be required for every distance (km), for example, oil change for every 5,000 km, brake and/or oil change for every 20,000 km, or change of front brake linings (e.g., pads or shoes) pads for every 30,000 km. In these cases, if the repair item required for every distance has been already inspected (or carried out), the MPU 100 decides whether the repair item is required or not based on the difference of the distance covered at which the repair item was inspected (or carried out) and the present distance covered. For example, where oil change for every 5,000 km and brake oil change for every 20,000 km, if the present distance covered is 20,000 km and oil change was carried out at the distance covered of 18,000 km, the repair item requiring inspection is brake oil change.

As mentioned above, in the present invention, various data are stored for a car care function. The stored data include vehicle information, repair record (reservation record), and operation record and so on. Such data may be stored in the format of XML (extensible markup language) for compatibility with other computers. For example, the vehicle information may be stored as follows:

```
<CAR>
    <NUMBER>3NA 1234</NUMBER>
    <NAME>AVANTE XD</NAME>
    ....
</CAR>
```

As stated above, when data is stored in the format of XML, the data stored at a mobile terminal can be managed in a computer. Generally, the mobile terminal's data can be copied into a computer via an ordinary communication cable or a portable memory card. In other words, users can effectively manage car care book data in connection with a computer.

As described above, where car care book function is implemented in a mobile terminal in accordance with the present invention, it advantageously facilitates managing vehicle maintenance information without an additional car care book or computer. Moreover, the present invention can calculate the expenses of vehicle maintenance and operation using the calculating capability of a mobile terminal. Also, the present invention can maximize the car care book function of a mobile terminal by employing the schedule alarm and automatic call as already implemented therein.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. An apparatus having a car care book function in a mobile terminal, comprising:
    a database for managing vehicle information, repair record and repair items required according to the distance covered;
    a controller for reading out and comparing the repair items required according to the distance covered and the repair record for a given period of time from the database, determining repair items requiring inspection through the comparison, and outputting repair items requiring inspection;
    a display for displaying repair items requiring inspection and a telephone number of a service center as stored in the database, on a window; and
    a communication unit for performing an automatic call to the telephone number of the service center by pressing a Talk key, when the telephone number of the service center is displayed on the window.

2. The apparatus as claimed in claim 1, wherein said vehicle information includes at least one of vehicle registration, vehicle name, model name, the year of the vehicle and information relating to the distance covered.

3. The apparatus as claimed in claim 1, further comprising an alarm-transmitting unit for transmitting an alarm when displaying repair items requiring inspection.

4. A method for performing a car care book function in a mobile terminal having a database for managing vehicle information, repair record and repair items required according to the distance covered, comprising steps:
    comparing the repair items required according to the present distance covered and the repair record for a given period of time from the database, wherein said database stores vehicle information, repair record and repair items required according to the distance covered;

selecting repair items requiring inspection through the comparison;

displaying repair items requiring inspection and a telephone number of a service center as stored in the database, on the window; and performing an automatic call to the telephone number of the service center by pressing a Talk key, when the telephone number of the service center is displayed on the window.

5. The method as claimed in claim 4, wherein said vehicle information includes at least one of vehicle registration, vehicle name, model name, the year of the vehicle and information relating to the distance covered.

6. The method as claimed in claim 4, further comprising the step of transmitting an alarm through a speaker when displaying repair items requiring inspection.

7. The method as claimed in claim 4, further comprising the step of storing at least one of a repair date, a repair item, a telephone number of a service center and a selected time of informing of repair reservation, which have been input by a user, in the database in a repair reservation mode; and the step of displaying a message informing of repair reservation in the window at said selected time of informing of repair reservation.

8. The method as claimed in claim 7, further comprising the step of pressing a Talk key to perform an automatic call to the telephone number of a service center, stored at the database, when the message informing of repair reservation is displayed on the window.

9. A method for performing a car care book function in a mobile terminal, comprising the steps:

storing a repair date, a repair item, a telephone number of a service center and a time informing of repair reservation, which have been input by a user, in a database while in a repair reservation mode; and displaying a message informing of a repair reservation and the telephone number of the service center in a window at said time informing of repair reservation, wherein selecting a desired key initiates a call to the telephone number.

* * * * *

UNITED STATES PATENT AND TRADEMARK OFFICE
CERTIFICATE OF CORRECTION

PATENT NO.       : 7,587,265 B2                                    Page 1 of 1
APPLICATION NO. : 11/191714
DATED            : September 8, 2009
INVENTOR(S)      : Hae-Moon Kwon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Twenty-first Day of September, 2010

David J. Kappos
*Director of the United States Patent and Trademark Office*